(12) United States Patent
Kim et al.

(10) Patent No.: US 9,777,344 B2
(45) Date of Patent: Oct. 3, 2017

(54) STAINLESS STEEL HAVING SUPERIOR SURFACE QUALITY AND MOLDABILITY FOR FUEL CELL DIVIDER SHEET, AND METHOD FOR MANUFACTURING SAME

(71) Applicant: POSCO, Pohang-si (KR)

(72) Inventors: Jong Hee Kim, Pohang-si (KR); Ki-Hoon Jo, Pohang-si (KR); Yang Jin Chung, Pohang-si (KR); Yun Yong Lee, Pohang-si (KR); Sang Woo Lee, Pohang-si (KR)

(73) Assignee: POSCO, Pohang-si (KR)

( * ) Notice: Subject to any disclaimer, the term of this patent is extended or adjusted under 35 U.S.C. 154(b) by 459 days.

(21) Appl. No.: 14/368,689

(22) PCT Filed: Dec. 26, 2012

(86) PCT No.: PCT/KR2012/011515
§ 371 (c)(1),
(2) Date: Jun. 25, 2014

(87) PCT Pub. No.: WO2013/100600
PCT Pub. Date: Jul. 4, 2013

(65) Prior Publication Data
US 2014/0338796 A1    Nov. 20, 2014

(30) Foreign Application Priority Data
Dec. 26, 2011   (KR) .................. 10-2011-0142160

(51) Int. Cl.
*C21D 8/02* (2006.01)
*C22C 38/00* (2006.01)
(Continued)

(52) U.S. Cl.
CPC .......... *C21D 8/0263* (2013.01); *C21D 6/002* (2013.01); *C22C 38/001* (2013.01);
(Continued)

(58) Field of Classification Search
CPC ...... C21D 8/0263; C22C 38/001; C22C 38/02
(Continued)

(56) References Cited

U.S. PATENT DOCUMENTS

2005/0211348 A1    9/2005  Miyazaki et al.
2010/0132842 A1    6/2010  Lee et al.
(Continued)

FOREIGN PATENT DOCUMENTS

JP    09157801     6/1997
JP    2004018950   1/2004
(Continued)

*Primary Examiner* — Weiping Zhu
(74) *Attorney, Agent, or Firm* — The Webb Law Firm

(57) ABSTRACT

Provided is a ferrite-based stainless steel having superior moldability when molding a fuel cell divider sheet from a material by controlling yield point elongation in accordance with alloy components. The ferrite-based stainless steel comprises, in weight percentages: no more than 0.02% of C; no more than 0.02% of N; no more than 0.4% of Si; no more than 0.2% of Mn; no more than 0.04% of P; no more than 0.02% of S; 25.0-32.0% of Cr; 0-1.0% of Cu; no more than 0.8% of Ni; no more than 0.01-0.5% of Ti; no more than 0.01-0.5% of Nb; no more than 0.01-1.5% of V; and residual Fe and inevitable elements, wherein the content of Ti, Nb, V, C, and N in terms of weight % of steel uses Formula (1) to render a yield point elongation of the material of no more than 1.1%, and wherein a steel material has superior moldability.

$$9.1C - 1.76V + 5.37(C+N)/Ti - 1.22Nb \leq 0.7. \quad \text{Formula (1)}$$

9 Claims, 4 Drawing Sheets

FORMULA (1) : 9.1C−1.7V+5.37(C+N)/Ti−1.22Nb

(51) Int. Cl.
  *C22C 38/02* (2006.01)
  *C22C 38/04* (2006.01)
  *C22C 38/06* (2006.01)
  *C22C 38/20* (2006.01)
  *C22C 38/26* (2006.01)
  *C22C 38/28* (2006.01)
  *C21D 6/00* (2006.01)
  *H01M 8/021* (2016.01)
  *C22C 38/22* (2006.01)
  *C22C 38/24* (2006.01)
  *C21D 1/26* (2006.01)

(52) U.S. Cl.
  CPC ............ *C22C 38/004* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *H01M 8/021* (2013.01); *C21D 1/26* (2013.01); *C21D 8/0226* (2013.01); *C21D 8/0236* (2013.01); *C21D 2211/004* (2013.01); *C21D 2211/005* (2013.01); *Y02P 70/56* (2015.11)

(58) Field of Classification Search
  USPC ........................................................ 148/534
  See application file for complete search history.

(56) References Cited

U.S. PATENT DOCUMENTS

| | | |
|---|---|---|
| 2011/0294042 A1 | 12/2011 | Kim et al. |
| 2012/0020827 A1 | 1/2012 | Nakamura et al. |
| 2012/0118442 A1* | 5/2012 | Ide ................. C21D 6/002 148/605 |

FOREIGN PATENT DOCUMENTS

| | | |
|---|---|---|
| JP | 200476154 | 3/2004 |
| JP | 2010-514930 A | 5/2010 |
| JP | 201147043 | 3/2011 |
| JP | 2011047043 A * | 3/2011 |
| KR | 10-2011-0115619 | 10/2011 |
| WO | 2010/077065 A2 | 7/2010 |

* cited by examiner

STAINLESS STEEL HAVING SUPERIOR SURFACE QUALITY AND MOLDABILITY FOR FUEL CELL DIVIDER SHEET, AND METHOD FOR MANUFACTURING SAME

CROSS-REFERENCE TO RELATED APPLICATIONS

This application is the United States national phase of International Application No. PCT/KR2012/011515 filed Dec. 26, 2012, and claims priority to Korean Patent Application No. 10-2011-0142160 filed Dec. 26, 2011, the disclosures of which are hereby incorporated in their entirety by reference.

TECHNICAL FIELD

The present invention relates to stainless steel for a fuel cell divider sheet, and a method of manufacturing the same, and more particularly, stainless steel for a fuel cell divider sheet having superior surface quality and moldability, of which yield point elongation in accordance with alloy ingredients is controlled, thereby not requiring a post processing, such as skin pass rolling and leveling, by the yield point elongation, and being appropriate to be molded into a thin plate of a fuel cell, and a method of manufacturing the same.

BACKGROUND ART

A polymer electrolyte fuel cell has a low working temperature of 70 to 100° C., a short operating time, and a high output density, thereby getting the spotlight as a power source for transport, a portable power source, a home power source, and the like, and a fuel cell stack includes a divider sheet including a membrane-electrode assembly including an electrolyte and electrodes (anode and cathode), and an end plate including an inlet/outlet of air and an inlet/outlet of hydrogen gas.

The fuel cell divider sheet is generally formed of one of graphite, a carbon complex, a Ti alloy, stainless steel, and conductive plastic. The stainless steel is also one of main materials of the fuel cell divider sheet. The stainless steel may have low interface contact resistance, superior corrosion resistance and thermal conductivity, and low gas transmissibility, be formed to have a large area, have superior product moldability, and be formed to be thin, thereby decreasing volume and weight of the fuel cell stack.

The metal divider sheet using stainless steel is subjected to a process of forming a channel provided with a flow path by using a material generally having a small thickness of around 0.1 mm by using stamping and hydroforming processes, unlike to a process of designing and manufacturing a flow path of a graphite divider sheet by using a mechanical machining method.

In the thin plate stainless steel, which is subjected to the aforementioned molding process, moldability of a material needs to be superior, there have to be no surface defect in a product after molding, and a molding deformed portion needs not to have necking and fracture even under a design requirement of various molding flow path depths and channel widths.

In terms of the moldability of the stainless steel thin plate product, there is a fracture phenomenon by local concentration of stress of the material by stretcher strain and the like by yield point elongation of the material depending on a section of plastic deformation applied to the material, and a moldability problem due to a surface defect or elongation deterioration by a non-uniform deformation pattern of a surface. The stretcher strain defect generated by yield point elongation of metal among the factors is a phenomenon in which non-uniform deformation of the material is incurred by the small amount of interstitial solid solution elements of the material, an intaglio pattern shaped like a flame is represented on a surface, and thus the entire surface becomes rough while the deformation continues, and this phenomenon may cause a defect by fine wrinkles formed at the channel portion, in which the flow path of the divider sheet is molded, or generation of fracture by local concentration of stress to a deformed portion of the material deformed area during the molding of the fuel cell divider sheet, so that a fundamental solution is demanded.

Accordingly, removal of yield point elongation may be considered as an essential element for improving moldability during the molding of the fuel cell divider sheet. In general, in order to remove yield point elongation, a method of removing yield point elongation by cold rolling or leveling a final rolled sheet material by 0.5 to 2%. However, there is a problem in that manufacturing cost of a material may be increased due to an additional process, such as cold rolling or leveling, and yield point elongation may be re-generated after a predetermined time.

An object of the present invention is to provide stainless steel for a fuel cell divider sheet having superior moldability, which has no stretcher strain by yield point elongation of a material, has superior elongation, and has no fracture by local concentration of stress to a deformed region of the material during molding of a flow path of the divider sheet for a thin plate material.

Another object of the present invention is to provide a method of manufacturing stainless steel, which has superior surface quality, in addition to moldability, to be used for a divider sheet of a fuel cell for a vehicle, home, and a portable use.

SUMMARY OF THE INVENTION

An exemplary embodiment of the present invention provides a stainless steel having superior surface quality and moldability, including: in weight %, more than 0 to no more than 0.02% of C; more than 0 to no more than 0.02% of N; more than 0 to no more than 0.4% of Si; more than 0 to no more than 0.2% of Mn; more than 0 to no more than 0.04% of P; more than 0 to no more than 0.02% of S; 25.0 to 32.0% of Cr, 0 to 1.0% of Cu; more than 0 to no more than 0.8% of Ni; 0.01 to 0.5% of Ti; 0.01 to 0.05% of Nb, 0.01 to 1.5% of V; residual Fe; and inevitably contained elements, wherein the stainless steel meets Formula (1) below, and has yield point elongation of no more than 1.1%.

$$9.1C-1.76V+5.37(C+N)/Ti-1.22Nb \leq 0.7 \quad \text{Formula (1)}$$

Further, the stainless steel may include more than 0 to no more than 0.3% of Ni in weight %.

In the present invention, the stainless steel may further include one or two elements selected from the group consisting of 0 to 4% of Mo and 0 to 1% of W in weight %.

Further, the stainless steel may include (Ti,Nb) (C,N) precipitates, in which an area fraction (%) of the entire precipitates per unit area in the stainless steel may be no more than 3.5%, and an area fraction (%) of (Ti,Nb) (C,N) precipitates/entire precipitates may be 62% or more.

Further, in the stainless steel, C+N may be no more than 0.032% in weight %.

Another exemplary embodiment of the present invention provides a method of manufacturing a stainless steel having superior surface quality and moldability, including: in weight %, more than 0 to no more than 0.02% of C; more than 0 to no more than 0.02% of N; more than 0 to no more than 0.4% of Si; more than 0 to no more than 0.2% of Mn; more than 0 to no more than 0.04% of P; more than 0 to no more than 0.02% of S; 25.0 to 32.0% of Cr; 0 to 1.0% of Cu; more than 0 to no more than 0.8% of Ni; 0.01 to 0.5% of Ti; 0.01 to 0.5% of Nb; 0.01 to 1.5% of V; residual Fe, and inevitably contained elements, in which the stainless steel having a composition meeting Formula (1) is subjected to a casting process, a hot rolling process, and a cold rolling process, and then cold-rolling annealing heat treatment, and yield point elongation is controlled to be no more than 1.1%, and a temperature of the cold annealing after the cold rolling process is controlled under a temperature condition of 900 to 1100° C.

$$9.1C-1.76V+5.37(C+N)/Ti-1.22Nb \le 0.7 \quad \text{Formula (1)}$$

Further, the stainless steel may include more than 0 to no more than 0.3% of Ni in weight %, and no more than 0.032% of C+N.

Further, the stainless steel may include (Ti,Nb) (C,N) precipitates, in which an area fraction (%) of the entire precipitates per unit area in the stainless steel is no more than may be no more than 3.5%, and an area fraction (%) of (Ti,Nb) (C,N) precipitates/entire precipitates may be 62% or more.

In the present invention, the stainless steel is repeatedly subjected to a casting process, hot rolling, hot annealing, cold rolling, and cold annealing, and a temperature of the cold annealing is a temperature condition of 900 to 1100° C.

As described above, it is possible to obtain the stainless steel for a fuel cell divider sheet having an optimum alloy design in which yield point elongation is decreased to 1.1% or lower by adjusting the quantity of interstitial alloy elements (C and N) of steel, and the content of appropriate stabilization elements (Ti, Nb, and V).

Further, the present invention may manufacture the stainless steel for a fuel cell divider sheet which does not require a post processing, such as skin pass rolling and leveling, within the component range, and is appropriate to mold a fuel cell thin plate.

DETAILED DESCRIPTION OF THE INVENTION

Figure 1:
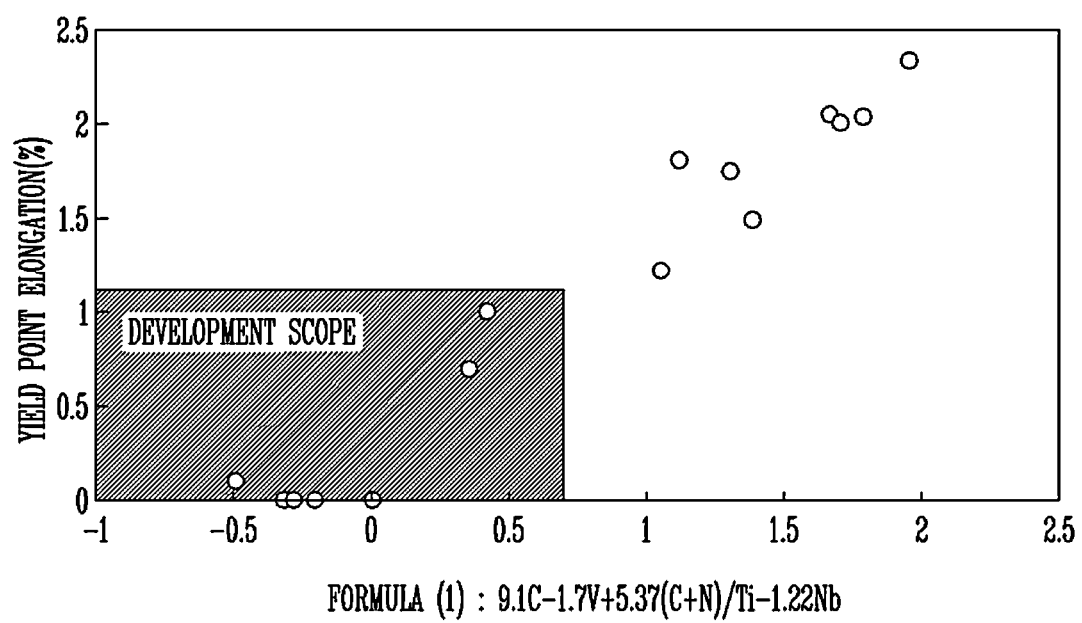
FIG. 1 is a graph illustrating a relationship between a content of a component element and measured yield point elongation according to the present invention.

Hereinafter, an exemplary embodiment of the present invention will be described in detail with reference to the accompanying drawings.

It is to be understood that the terminology used therein is for the purpose of describing particular embodiments only and is not intended to be limiting. It should be noted that, as used in the specification and the appended claims, the singular forms include plural references unless the context clearly dictates otherwise. It will be further understood that the terms "comprises" and/or "comprising," when used in this specification, specify the presence of stated properties, regions, integers, steps, operations, elements, and/or components, but do not preclude the presence or addition of one or more other properties, regions, integers, steps, operations, elements, and/or components thereof.

All of the terminologies containing one or more technical or scientific terminologies have the same meanings that persons skilled in the art understand ordinarily unless they are not defined otherwise. The terminologies that are defined previously are further understood to have the meaning that coincides with the contents that are disclosed in relating technical documents, but not as the ideal or very official meaning unless it is not defined.

Ferrite-based stainless steel for a fuel cell divider sheet having superior moldability and surface quality according to the present invention further includes a composition including one or two elements selected from the group consisting of, in weight%, more than 0 and no more than 0.2% of C, more than 0 and no more than 0.2% of N, more than 0 and no more than 0.4% of Si, more than 0 and no more than 0.2% of Mn, more than 0 and no more than 0.4% of P, more than 0 and no more than 0.2% of S, 25.0 to 32.0% of Cr, 0 to 1.0% of Cu, more than 0 and no more than 0.8% of Ni, 0.01 to 0.5% of Ti, 0.01 to 0.5% of Nb, 0.01 to 1.5% of V, 0 to 4% of Mo, and 0 to 1% of W, and residual Fe, and inevitably contained elements.

In the present invention, a final cold rolled product is manufactured by forming a hot rolled coil by performing hot rolling, annealing, and picking on a slab having the composition, and repeatedly performing cold rolling, annealing, and picking or cold rolling and bright annealing on the hot rolled coil.

Hereinafter, a composition range of the present invention and a reason of limitation of the composition range will be described in more detail. Further, % described in below means weight %.

C is an element of forming carbide and exists in an interstitial type, so that when C is excessively contained, strength may be increased, but an elongation rate may deteriorate. Further, the excessive containment of C increases yield point elongation, thereby causing deterioration of moldability. Accordingly, it is preferable that the content of C is limited to no more than 0.02%.

N is an element of forming a nitride and exists in an interstitial type, so that when N is excessively contained, strength may be increased, but an elongation rate and yield point elongation are disadvantageous. Accordingly, it is preferable that the content of N is limited to no more than 0.02%.

Si is an effective element for deoxidation, but suppresses toughness and moldability, so that a composition ratio of Si is limited to no more than 0.4% in the present invention.

Mn is an element increasing deoxidation, but MnS, which is an inclusion, decreases corrosion resistance, so that a composition ratio of Mn is limited to no more than 0.2% in the present invention.

P decreases toughness, as well as corrosion resistance, so that a composition ratio of P is limited to no more than 0.04% in the present invention.

S degrades an anti-pitting property and hot processibility, so that a composition ratio of S is limited to no more than 0.02% considering the degradation of an anti-pitting property and hot processibility in the present invention.

Cr increases corrosion resistance in an acidic atmosphere, in which a fuel cell is operated, but decreases an elongation rate to degrade moldability, so that a composition ratio of Cr is limited to 25% to 32% in the present invention.

Cu increases corrosion resistance in an acidic atmosphere, in which a fuel cell is operated, but decreases an elongation rate to degrade moldability when exceeding 1%, so that a composition ratio of Cr is limited to no more than 1%.

When Ni is added to exceed a composition ratio of 0.8%, Ni is eluted and an elongation rate is decreased during an operation of the fuel cell, so that moldability of a material may be degraded. Accordingly, it is preferable that a composition ratio of Ni is preferably limited to no more than 0.8%. Further, when Ni is added with a composition ratio of no more than 0.3%, Ni more effectively influences softness of a material, thereby improving moldability. Accordingly, it is more preferable that a composition ratio of Ni is limited to more than 0 to no more than 0.3%.

Ti and Nb are effective elements for forming C and N in the steel into a carbide, and particularly, are effective elements for increasing an elongation rate of a material, and suppressing yield point elongation. Accordingly, when Ti and Nb are excessively added, appearance deteriorates and toughness is decreased by an inclusion. Considering this, a composition of each of Ti and Nb is limited to 0.01 to 0.5% in the present invention.

V is an element for forming carbide, and is an effective element for suppressing yield point elongation to improve moldability. When V is excessively added, corrosion resistance and toughness are degraded, and cost of V is high, so that a composition ratio of V is limited to 0.01 to 1.5%.

Mo serves to increase corrosion resistance in an environment atmosphere in which the fuel cell is operated, but when Mo is excessively added, Mo decreases an elongation rate and economical feasibility of a material, so that a composition ratio of Mo is limited to a range of 0% to 5% in the present invention.

W has an effect in increasing corrosion resistance in an acidic atmosphere, in which the fuel cell is operated, and decreasing interface contact resistance, but when W is excessively added, W decreases an elongation rate of a material to degrade moldability. Accordingly, considering this, a composition ratio of W is limited to 0 to 1.0% in the present invention.

In the present invention, one or more kinds of Mo and W may be added.

In the meantime, in composing steel in the present invention, when contents of C, N, V, Ti, and Nb in the composition ranges of Formula (1) below are adjusted to be no more than 0.7, it is possible to manufacture a steel material having yield point elongation of a material of no more than 1.1% and superior moldability. Herein, Formula (1) is a result obtained by inserting a value of weight % for each component, for example, C, N, V, Ti, and Nb.

$$9.1C - 1.76V + 5.37(C+N)/Ti - 1.22Nb \leq 0.7 \quad \text{Formula (1)}$$

Hereinafter, a process of manufacturing stainless steel including the aforementioned composition will be described.

In the present invention, first, the steel, which is alloy-designed as described above, is manufactured into a slab through a casting process. Next, the slab is repeatedly subjected to hot rolling, hot annealing, cold rolling, and then an annealing heat treatment, and then a final cold-rolled plate having a desired thickness is manufactured. In the present manufacturing process, a temperature of the cold annealing may be a temperature condition of 900 to 1100° C. When the temperature of the cold annealing is 1100° C. or higher, grain is coarsened, so that a yield point elongation phenomenon may be removed, but an elongation rate is decreased, so that moldability is poor and there is a concern in strip breakage by coil tension during the annealing. When the temperature of the cold annealing is 900° C. or lower, a recrystallization texture is not developed, so that moldability is poor.

Exemplary Embodiment

Hereinafter, the present invention will be described with reference to the exemplary embodiment in more detail.

Table 1 represents a relationship of yield point elongation between the present invention and the Comparative Example.

Formula (1) represented in Table 1 is described below.

$$9.1C - 1.76V + 5.37(C+N)/Ti - 1.22Nb \quad \text{Formula (1)}$$

Further, yield point elongation was measured for a cold rolled sheet of 0.2 mm.

TABLE 1

| | C | Si | Al | P | S | Cr | Cu | Ti | Mb | V | N | Others | Yield point elongation (%) | Formula (1) |
|---|---|---|---|---|---|---|---|---|---|---|---|---|---|---|
| Steel 1 of Comparative Example | 0.0077 | 0.113 | 0.05 | <0.003 | <0.002 | 30.13 | 0.49 | 0.05 | 0.24 | 0.41 | 0.0130 | | 1.8 | 1.28 |
| Steel 2 of Comparative Example | 0.0082 | 0.119 | 0.05 | <0.003 | <0.002 | 30.06 | — | 0.05 | 0.25 | 0.41 | 0.0160 | | 2.0 | 1.65 |
| Steel 3 of Comparative Example | 0.0072 | 0.113 | 0.04 | <0.003 | <0.002 | 28.02 | — | 0.05 | 0.25 | 0.41 | 0.0150 | | 1.5 | 1.42 |
| Steel 4 of Comparative Example | 0.0082 | 0.110 | 0.05 | <0.003 | <0.002 | 28.05 | 0.49 | 0.05 | 0.24 | 0.41 | 0.0160 | | 2.1 | 1.66 |
| Steel 5 of Comparative Example | 0.0036 | 0.126 | 0.03 | <0.003 | <0.002 | 29.90 | 0.51 | 0.04 | 0.35 | 0 | 0.0080 | | 1.2 | 1.16 |
| Steel 6 of Comparative Example | 0.0035 | 0.126 | 0.01 | <0.003 | <0.002 | 30.27 | 0.49 | 0.04 | 0.37 | 0 | 0.0084 | | 1.8 | 1.18 |

TABLE 1-continued

| | C | Si | Al | P | S | Cr | Cu | Ti | Mb | V | N | Others | Yield point elongation (%) | Formula (1) |
|---|---|---|---|---|---|---|---|---|---|---|---|---|---|---|
| Steel 7 of Comparative Example | 0.0083 | 0.130 | 0.02 | <0.003 | <0.002 | 29.60 | 0.51 | 0.05 | 0.50 | 0.40 | 0.0170 | | 2.0 | 1.48 |
| Steel 8 of Comparative Example | 0.0065 | 0.113 | 0.02 | <0.003 | <0.002 | 29.89 | 0.51 | 0.05 | 0.25 | 0.40 | 0.0190 | | 2.3 | 1.79 |
| Steel 1 of the presnet invention | 0.0047 | 0.112 | 0.05 | <0.003 | <0.002 | 28.01 | — | 0.05 | 0.15 | 0.3 | 0.0080 | | 1.1 | 0.7 |
| Steel 2 of the presnet invention | 0.0070 | 0.084 | 0.05 | <0.003 | <0.002 | 30.27 | — | 0.11 | 0.08 | 0.50 | 0.0190 | | 0.7 | 0.36 |
| Steel 3 of the presnet invention | 0.0060 | 0.111 | 0.05 | <0.003 | <0.002 | 30.43 | — | 0.10 | 0.24 | 0.50 | 0.0150 | | 0.2 | 0.01 |
| Steel 4 of the presnet invention | 0.0060 | 0.135 | 0.05 | <0.003 | <0.002 | 30.43 | — | 0.18 | 0.08 | 0.49 | 0.0170 | | 0.1 | −0.22 |
| Steel 5 of the presnet invention | 0.0060 | 0.126 | 0.05 | <0.003 | <0.002 | 30.49 | — | 0.20 | 0.24 | 0.50 | 0.0170 | | 0.01 | −0.50 |
| Steel 6 of the presnet invention | 0.0060 | 0.116 | 0.05 | <0.003 | <0.002 | 30.20 | 0.51 | 0.20 | 0.24 | 0.50 | 0.0170 | | 0.0 | −0.50 |
| Steel 7 of the presnet invention | 0.0060 | 0.093 | 0.05 | <0.003 | <0.002 | 30.44 | — | 0.16 | 0.20 | 0.47 | 0.0150 | 1Mo | 0.0 | −0.31 |

Figure 2:
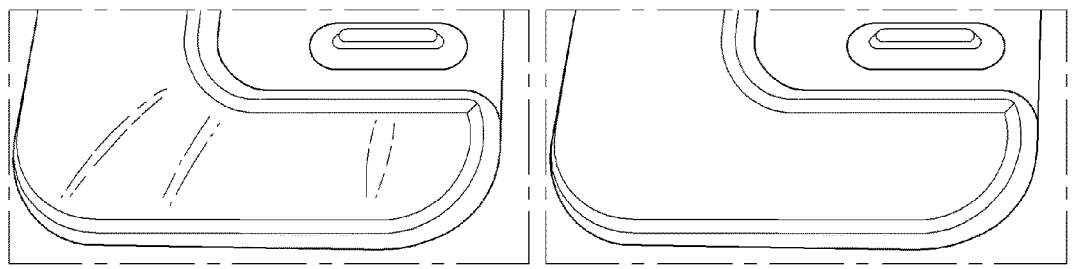
FIG. 2 is a picture diagram illustrating surfaces shapes of a fuel cell divider sheet molded product molded by Steel of the Comparative Example and steel of the present invention.

An ingot is manufactured by dissolving the alloy having the composition represented in Table 1 in a vacuum induction furnace of a capacity of 50 kg. A hot rolled steel plate is manufactured by hot rolling and then hot annealing the manufactured ingot. Then, a cold rolled plate is manufactured by cold rolling the hot rolled plate so as to have a final thickness of 0.2 mm. The manufactured cold rolled plate was annealed at a heating temperature of 1000° C., and then was subjected to rapid cooling. The manufactured cold rolled plate is processed to a specimen in a direction parallel to a rolling direction under the specimen standard JIS13B after picking, and a tension test thereof is performed at a crosshead speed of 20 mm/min. A yield point elongation rate according to each material element is measured through the tension test. FIG. 1 illustrates a result of comparison between yield point elongation (%) and Formula (1) of the cold rolled and annealed plate having a thickness of 0.2 mm according to Table 1, and FIG. 2 illustrates a result of a surface shape of a material, which is obtained by performing cold rolling (0.2 mm t) and annealing heat treatment on Steel 5 of the Comparative Example (left side) and Steel 1 of the present invention (right side) at a temperature of 1000° C., stamping molded into a fuel cell divider sheet with an electrode effective area of 200cm². Steel 5 of the Comparative Example exhibits a stretcher strain defect in a shape of an intaglio pattern on the surface after the processing, but Steel 1 of the present invention may obtain a good surface quality having no stretcher strain defect. Further, in an aspect of a thickness decrease rate of a deformed portion, it is possible to obtain better moldability from Steel 1 of the present invention, than Steel 5 of the Comparative Example. As represented in Table 1 and FIG. 2, it can be seen that moldability is improved in Steel 1 of the present invention (yield point elongation is 1.1%, and a result value of Formula (1) is 0.7), compared to Steel 5 of the Comparative Example (yield point elongation is 1.2%, and a result value of Formula (1) is 1.16).

The yield point elongation is an item based on which moldability may be confirmed, and when the yield point elongation exceeds 1.1%, there occurs problem in that local concentration of stress to a processing deformed portion (an arrow of FIG. 2) is intensified during the processing of the steel in order to use the steel for the fuel cell divider sheet, so that a stripe shape is formed. That is, when the yield point elongation exceeds 1.1%, and a value according to Formula (1) exceeds 0.7, moldability deteriorates.

As represented in Table 1, it is preferable that the yield point elongation is no more than 1.1%, and it can be seen that the yield point elongation is decreased when the calculated value of Formula (1) is adjusted to be no more than 0.7 by appropriately adjusting contents of interstitial alloy elements (C and N) and V, Ti, and Nb, which are the carbide forming elements. When the calculated value of Formula (1) exceeds 0.7, yield point elongation exceeds 1.1%.

FIG. 1 illustrates a result of comparison of yield point elongation (%) of the cold rolled and annealed plate having a thickness of 0.2 mm according to the component content of the present invention based on the value of Formula (1).

Accordingly, referring to FIG. 1 and Table 1, it can be seen that when a value of Formula (1) is no more than 0.7, yield point elongation is no more than 1.1%, and the stainless steel has moldability appropriate to the fuel cell divider sheet at yield point elongation of no more than 1.1%.

Further, the stainless steel according to the present exemplary embodiment may include (Ti, Nb) (C, N) precipitates, $Nb_2C$ precipitates, and laves phase ($Fe_2Nb$) precipitates. A surface of the stainless steel may be covered by the (Ti, Nb)(C, N) precipitates, the $Nb_2C$ precipitates, and the laves phase ($Fe_2Nb$) precipitates (the entire precipitates), and in this case, an area fraction of the entire precipitates per unit area of the stainless steel may be no more than 3.5%, and an area fraction of (Ti, Nb)(C, N) precipitates/entire precipitates (%), which is the ratio of the (Ti, Nb)(C, N) precipitates with respect to the entire precipitates, may be 62% or more. Here, (Ti, Nb)(C, N) precipitates exist as one precipitate phase, and the (Ti, Nb)(C, N) precipitates effectively fix N and C within a base, thereby improving yield point elongation of the stainless steel to improve moldability.

randomly measured by using the transmission electron microscope while changing a position thereof, and each of values described in Table 2 is an average value of values of five times of measurement performed on one specimen (one kind of steel).

TABLE 2

| | Entire precipitates | Area fraction of entire precipitates per unit area (%) | Area fraction (Ti,Nb)(C,N)/entire precipitates (%) |
|---|---|---|---|
| Steel 1 of the Comparative Example | (Ti,Nb)(C,N),Nb$_2$C,(Fe,Cr)$_2$Nb | 4.0 | 52 |
| Steel 2 of the Comparative Example | (Ti,Nb)(C,N),Nb$_2$C,(Fe,Cr)$_2$Nb | 4.2 | 41 |
| Steel 3 of the Comparative Example | (Ti,Nb)(C,N),Nb$_2$C,(Fe,Cr)$_2$Nb | 4.2 | 55 |
| Steel 4 of the Comparative Example | (Ti,Nb)(C,N),Nb$_2$C,(Fe,Cr)$_2$Nb | 5.6 | 52 |
| Steel 5 of the Comparative Example | (Ti,Nb)(C,N),Nb$_2$C,(Fe,Cr)$_2$Nb | 3.7 | 57 |
| Steel 6 of the Comparative Example | (Ti,Nb)(C,N),Nb$_2$C,(Fe,Cr)$_2$Nb | 5.1 | 50 |
| Steel 7 of the Comparative Example | (Ti,Nb)(C,N),Nb$_2$C,(Fe,Cr)$_2$Nb | 4.2 | 49 |
| Steel 8 of the Comparative Example | (Ti,Nb)(C,N),Nb$_2$C,(Fe,Cr)$_2$Nb | 4.1 | 44 |
| Steel 1 of the presnet invention | (Ti,Nb)(C,N),Nb$_2$C,(Fe,Cr)$_2$Nb | 1.8 | 65 |
| Steel 2 of the presnet invention | (Ti,Nb)(C,N),Nb$_2$C | 2.4 | 70 |
| Steel 3 of the presnet invention | (Ti,Nb)(C,N),Nb$_2$C,(Fe,Cr)$_2$Nb | 2.8 | 80 |
| Steel 4 of the presnet invention | (Ti,Nb)(C,N),Nb$_2$C,(Fe,Cr)$_2$Nb | 3.4 | 82 |
| Steel 5 of the presnet invention | (Ti,Nb)(C,N),Nb$_2$C,(Fe,Cr)$_2$Nb | 3.2 | 82 |
| Steel 6 of the presnet invention | (Ti,Nb)(C,N),Nb$_2$C,(Fe,Cr)$_2$Nb | 3 | 83 |
| Steel 7 of the presnet invention | (Ti,Nb)(C,N),Nb$_2$C,(Fe,Cr)$_2$Nb | 2.9 | 82 |

It can be seen that a partial fraction of the (Ti, Nb)(C, N) precipitates, in which V and Cr are partially solid-dissolved, tend to be increased and an area fraction of the entire precipitates per unit area is decreased than the Nb2C precipitates and the laves phase (Fe$_2$Nb) when the alloy component per unit area (100 nm$^2$) for the entire precipitates included on the surface of the stainless steel is adjusted to have no more than 0.7 calculated by Formula (1), compared to the case where the alloy component per unit area (100 nm$^2$) for the entire precipitates included on the surface of the stainless steel exceeds 0.7. Here, the area fraction of the entire precipitates means a degree by which the entire precipitates covers the steel with respect to the entire area of the steel (after the annealing of the cold rolled steel with 0.2 mm) used as the specimen.

Table 2 is a result of an analysis of the entire precipitates and an area fraction of the entire precipitates per unit area (100 nm$^2$) measured by a Transmission Electron Microscope (TEM) by using an image analysis instrument for the steel of Table 1. In this case, in Table 2, each kind of steel was Referring to Table 2, it can bee seen that an area fraction of the entire precipitates per unit area of each of Steel 1 to 8 of the Comparative Example has a minimum of 3.7% to a maximum of 5.6%, but an area fraction of the entire precipitates per unit area of each of Steel 1 to 7 of the present invention has a maximum of 3.4%, which is no more than 3.5%. Further, it can bee seen that an area fraction of (Ti,Nb)(C,N) precipitates for the entire precipitates of each of Steel 1 to 8 of the Comparative Example has a maximum of 57%, but an area fraction of (Ti,Nb)(C,N) precipitates for the entire precipitates of each of Steel 1 to 7 of the present invention has a maximum of 83% and a minimum of 65%, thereby having a larger value than those of Steel 1 to 8 of Comparative Example. Accordingly, it can be seen that when the area fraction of the entire precipitates per unit area is no more than 3.5% as in Steel 1 to 7 of the present invention, and the area fraction of (Ti,Nb)(C,N) precipitates/entire precipitates (%) is 62% or more, a value of Formula (1) is no more than 0.7, and yield point elongation also exceeds 1.1%.

When the precipitates are increased in the stainless steel, the precipitates may harden a substrate of the steel. Accordingly, the increase of the precipitates may increase yield point elongation, and in this case, when the area fraction per unit area of the total quantity of the precipitates (entire precipitates) exceeds 3.5%, moldability of the steel may deteriorate. In this case, an area fraction of (Ti, Nb)(C, N) precipitates/entire precipitates (%), which is the ratio of the (Ti, Nb)(C, N) precipitates with respect to the entire precipitates, is preferably 62% or more, and when an area fraction of (Ti, Nb)(C, N) precipitates/entire precipitates (%) is less than 62%, C and N cannot be solid-dissolved, thereby increasing yield point elongation and degrading moldability. Accordingly, the area fraction of the entire precipitates per unit area of the stainless steel is no more than 3.5%, and an area fraction of (Ti, Nb)(C, N) precipitates/entire precipitates (%) is 62% or more, and contents of C and N solid-dissolved in the substrate of the stainless steel may be considerably reduced, the contents of V, Ti, and Nb, and the contents of the interstitial elements (C and N) in the steel may have an appropriate level, so that there is no yield point elongation, and the participates are not excessively generated, thereby improving moldability. Accordingly, it is possible to prevent local fracture or necking of the deformed portion when molding a surface shape of stainless steel and the fuel cell divider sheet, thereby providing a steel material having superior moldability.

Table 3 represents a result of a relationship of yield point elongation for C+N according to the present invention and the Comparative Example. In Steel of the Comparative Example, and Steel of the present invention of Table 3, the relationship is confirmed by the same method using the cold rolled sheet of 0.2 mm that is the same as that of Table 1.

the value of C+N is controlled to have no more than 0.032%, so that it is possible to decrease the contents of entire solid-dissolved C and N in the steel, thereby minimizing yield point elongation, and to minimize carbonitride formed of C and N with Ti, Nb, and V, thereby improving general moldability.

Table 3 is a confirmed result of yield point elongation for Steel 9 to 11 of the Comparative Example, and Steel 8 to 10 of the present invention. As represented in Steel 9 to 11 of the Comparative Example, it can be seen that when the values of C+N are 0.0377, 0.038, and 0.034, the values of yield point elongation are 2.5, 2, and 1.5, respectively, and moldability is disadvantageous. Further, it can be seen that the values according to Formula (1) for Steel 9 to 11 of the Comparative Example are 1.677, 3.202, and 2.622, which exceed 0.7.

In the meantime, in the case of steel 8 to 10 of the present invention, it can be seen that when the values of C+N are 0.012, 0.018, and 0.032, yield point elongation is 0.5, 0.4, and 1.1, respectively, all of which are no more than 1.1%. Further, it can be seen that the values according to Formula (1) for steel 8 to 10 of the present invention are 0.1, −0.041, and 0.697, all of which are no more than 0.7, and steel 8 to 10 of the present invention have superior surface quality and moldability, thereby being appropriately used for the fuel cell divider sheet. That is, as represented in Table 3, it can be seen that the total amount of C+N may be managed based on the precipitates elements, and the value of C+N is preferably managed to be no more than 0.032%, considering moldability, yield point elongation, and manufacturing cost of the stainless steel.

TABLE 3

| | C | Si | Cr | Ti | Nb | V | N | C + N | Yield point elongation (%) | Formula (1) |
|---|---|---|---|---|---|---|---|---|---|---|
| Steel 9 of the Comparative Example | 0.0177 | 0.113 | 30.13 | 0.08 | 0.24 | 0.41 | 0.02 | 0.0377 | 2.5 | 1.677 |
| Ssteel 10 of the Comparative Example | 0.022 | 0.119 | 30.06 | 0.05 | 0.25 | 0.44 | 0.016 | 0.038 | 2 | 3.202 |
| Steel 11 of the Comparative Example | 0.019 | 0.113 | 28.02 | 0.05 | 0.25 | 0.51 | 0.015 | 0.034 | 1.5 | 2.622 |
| Steel 8 of the present invention | 0.005 | 0.112 | 28.01 | 0.08 | 0.024 | 0.41 | 0.007 | 0.012 | 0.5 | 0.100 |
| Steel 9 of the present invention | 0.007 | 0.09 | 30.27 | 0.11 | 0.056 | 0.52 | 0.011 | 0.018 | 0.4 | −0.041 |
| Steel 10 of the present invention | 0.018 | 0.111 | 30.43 | 0.1 | 0.25 | 0.5 | 0.014 | 0.032 | 0 | 0.697 |

In the stainless steel according to the present exemplary embodiment, C+N may be no more than 0.032% in weight %. When the large amount of C and N is contained, the contents of solid-dissolved C and N are increased, and the large amount of precipitates is formed, thereby increasing yield point elongation and degrading moldability. In this case, in order to reduce the contents of solid-dissolved C and N, which increase yield point elongation when the value of C+N exceeds 0.032%, the excessive contents of Ti, Nb, and V need to be added, so that manufacturing cost of the stainless steel may be unnecessarily increased, or a material softening effect is hindered by the excessive forming of carbonitride, thereby degrading general moldability. That is, FIGS. 4A and 4B are pictures of a transmission electron microscopy of Steel 4 (FIG. 4A) of the Comparative Example and Steel 5 (FIG. 4B) of the present invention of Tables 1 and 2.

Figure 4A:
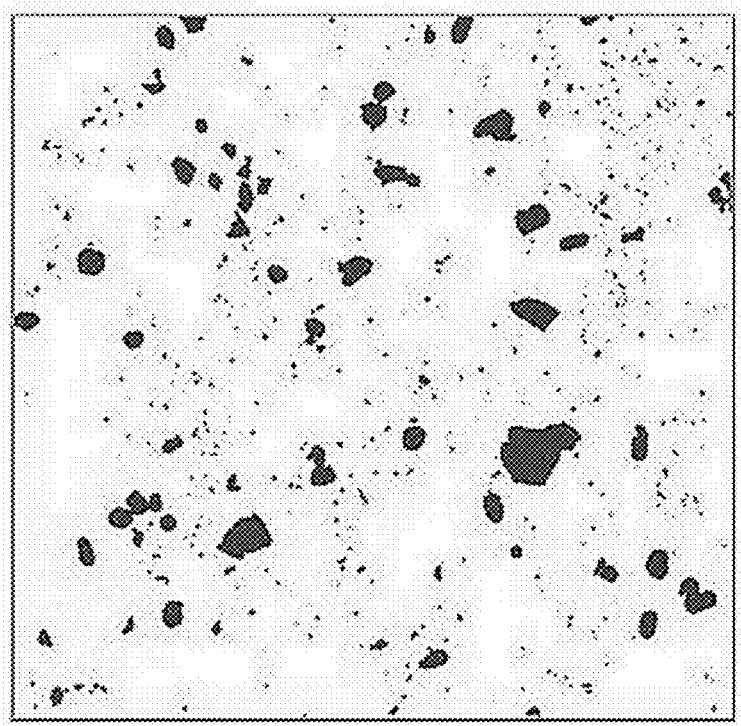
FIGS. 4A and 4B are pictures of a transmission electron microscopy of Steel 4 of the Comparative Example (FIG. 4A) and Steel 5 of the present invention (FIG. 4B) of Tables 1 and 2.
Figure 4B:
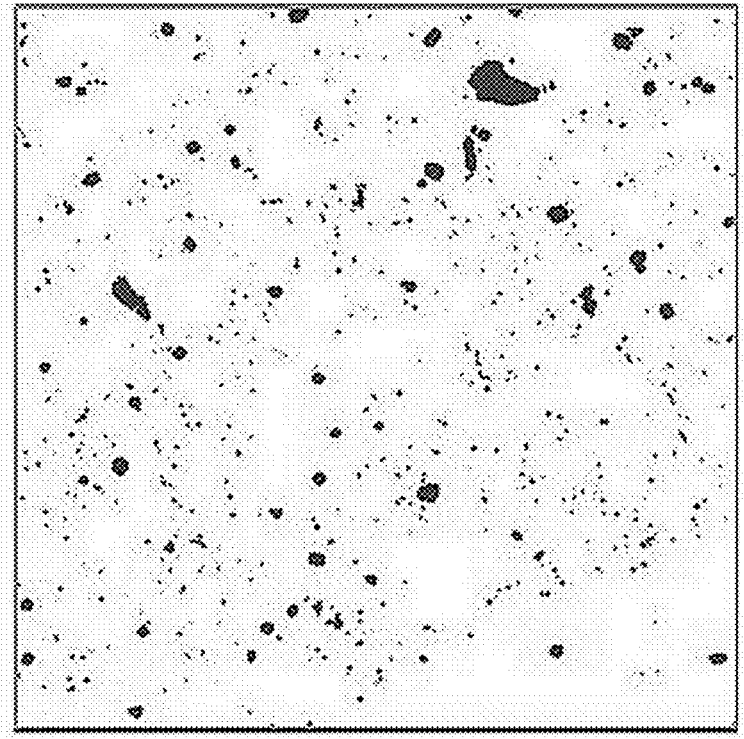

Referring to FIG. 4, it can be seen that in the case of FIG. 4A that is Steel 4 of the Comparative Example, a ratio of the entire precipitates per unit area (100 nm$^2$) of the stainless steel is 5.6% in an area fraction, and in the case of FIG. 4B that is steel 5 of the present invention, a ratio of the entire precipitates per unit area (100 nm$^2$) of the stainless steel is 3.2% in an area fraction.

The result is the ferrite-based stainless steel including, in weight %, no more than 0.02% of C, no more than 0.02% of N, no more than 0.4% of Si, no more than 0.2% of Mn, no more than 0.4% of P, no more than 0.02% of S, 25.0 to 32.0% of Cr, 0 to 1.0% of Cu, no more than 0.8% of Ni, 0.01 to 0.5% of Ti, 0.01 to 0.5% of Nb, 0.01 to 1.5% of V, residual Fe, and inevitable contained elements, and by using an alloy component, in which, in weight%, the contents of Ti, Nb, V, C, and N in steel are adjusted to be the component range of 0.7% according to Formula (1), it is possible to manufacture a steel material which has yield point elongation of the material for molding the fuel cell divider sheet of no more than 1.1%, has superior surface quality of a molded product, and achieves superior moldability having no necking of the deformed portion.

Figure 3:
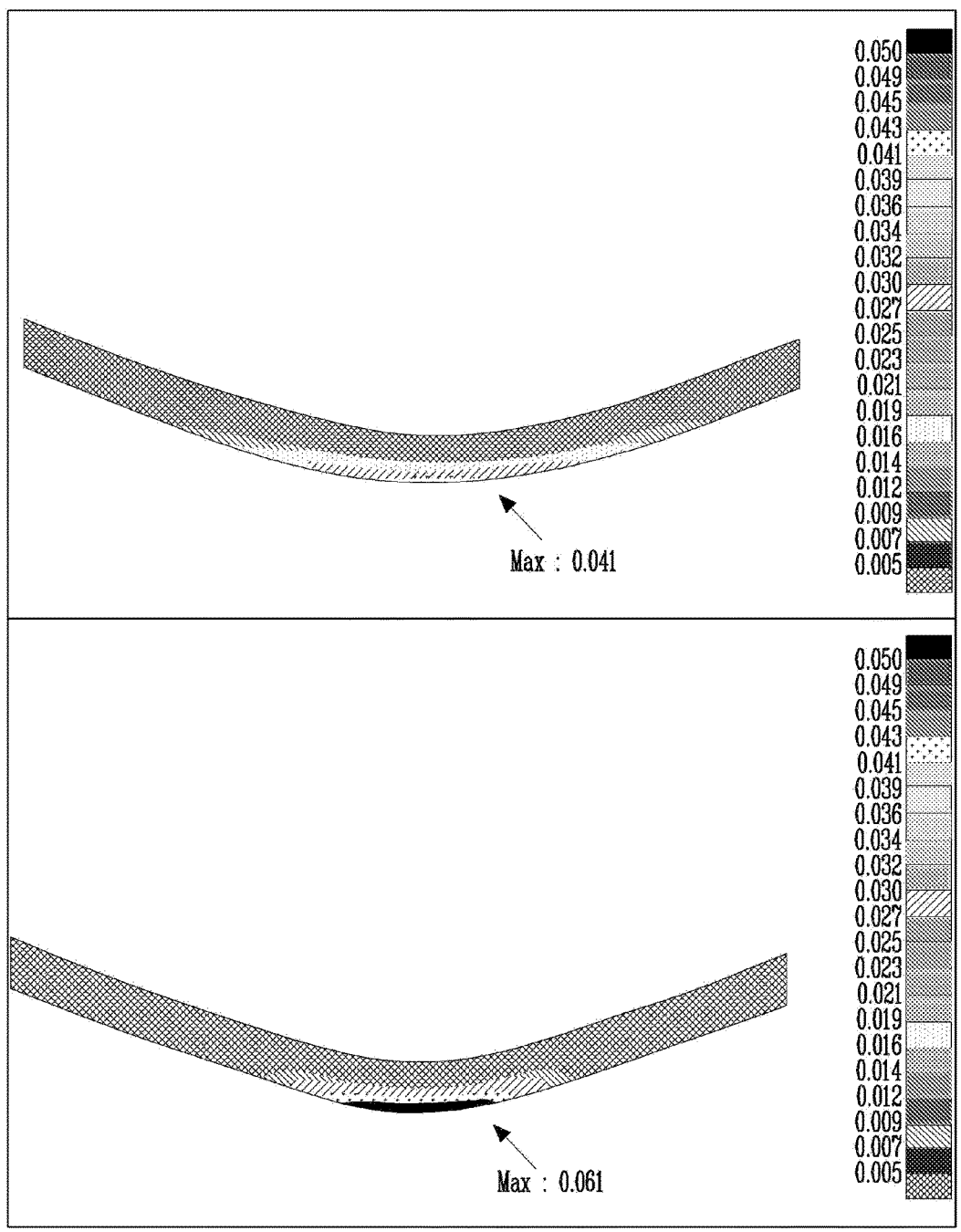
FIG. 3 is a graph illustrating a computer simulation result of a true stain rate distribution in a longitudinal direction of a specimen and a maximum value thereof at the same stroke of a punch, during a V-bending test in the case where there is no yield point elongation (an upper diagram) and there is yield point elongation of 4% (a lower diagram).

In the meantime, FIG. 3 is a graph illustrating a computer simulation result of a true stain rate distribution in a longitudinal direction of a specimen and a maximum value thereof at the same stroke of a punch, during a V-bending test in the case where there is no yield point elongation (an upper diagram) and there is yield point elongation of 4% (a lower diagram). The case where there is yield point elongation shows a maximum strain rate of a bending deformation concentrated portion in a longitudinal direction of 0.061, and shows a result that a strain rate of 0.02 is increased (about 2% in an engineering strain rate) compared to the case of the test of the material having no yield point elongation which has a maximum strain rate of 0.041. Further, in the case where there is yield point elongation, a deformed shape of the specimen shows a slightly bent shape, not a relatively smooth curve line, and this is a phenomenon generated due to concentration of deformation because an yield point elongation phenomenon fails to induce the distribution of deformation increased from the surface of the material in the longitudinal direction of the specimen during the bending deformation of the material, and means deterioration of bending resistance. This may cause excessive deformation concentration and degrade of a thickness decrease rate in a stamping process of the fuel cell divider sheet mainly including a bending molding mode. Accordingly, removal of yield point elongation may be considered as an essential element for improving moldability during the molding of the fuel cell divider sheet. In general, in order to remove yield point elongation, a method of removing yield point elongation by cold rolling or leveling a final rolled sheet material by 0.5 to 2%. However, there is a problem in that manufacturing cost of a material may be increased due to an additional process, such as cold rolling or leveling, and yield point elongation may be re-generated after a predetermined time.

Further, the present invention may further include an operation of molding the stainless steel alloy designed with the aforementioned composition into a thin plate for the fuel cell divider sheet, thereby finally obtaining stainless steel for the high polymer fuel cell divider sheet.

The technical spirit of the present disclosure have been described according to the exemplary embodiment in detail, but the exemplary embodiment has described herein for purposes of illustration and does not limit the present disclosure. Further, those skilled in the art will understand various modification examples may be available within the scope of the technical spirit of the present invention.

The invention claimed is:

1. A stainless steel having superior surface quality and moldability, comprising:
   in weight %, more than 0 to no more than 0.02% of C; more than 0 to no more than 0.02% of N; more than 0 to no more than 0.4% of Si; more than 0 to no more than 0.2% of Mn; more than 0 to no more than 0.04% of P; more than 0 to no more than 0.02% of S; 25.0 to 32.0% of Cr, 0 to 1.0% of Cu; more than 0 to no more than 0.8% of Ni; 0.01 to 0.5% of Ti; 0.01 to 0.05% of Nb, 0.01 to 1.5% of V; residual Fe; and inevitably contained elements,
   wherein the stainless steel meets Formula (1) below, and has yield point elongation of no more than 1.1%, $$9.1C - 1.76V + 5.37(C+N)/Ti - 1.22Nb \leq 0.7 \qquad \text{Formula (1)}$$

and wherein the stainless steel further comprises (Ti,Nb)(C,N) precipitates, wherein an area fraction (%) of the entire precipitates per unit area in the stainless steel is no more than 3.5%, and an area fraction (%) of (Ti,Nb)(C,N) precipitates/entire precipitates is 62% or more.

2. The stainless steel of claim 1, further comprising: one or two elements selected from the group consisting of 0 to 4% of Mo and 0 to 1% of W in weight %.

3. The stainless steel of claim 1, wherein the yield point elongation of the stainless steel is measured for a cold rolled sheet having a thickness of no more than 0.2 mm.

4. The stainless steel of claim 1, comprising: more than 0 to no more than 0.3% of Ni in weight %.

5. The stainless steel of claim 1, wherein C+N is no more than 0.032% in weight %.

6. A method of manfuacturing a stainless steel having superior surface quality and moldability, comprising: in weight %, more than 0 to no more than 0.02% of C; more than 0 to no more than 0.02% of N; more than 0 to no more than 0.4% of Si; more than 0 to no more than 0.2% of Mn; more than 0 to no more than 0.04% of P; more than 0 to no more than 0.02% of S; 25.0 to 32.0% of Cr; 0 to 1.0% of Cu; more than 0 to no more than 0.8% of Ni; 0.01 to 0.5% of Ti; 0.01 to 0.5% of Nb; 0.01 to 1.5% of V; residual Fe, and inevitably contained elements,
   wherein the stainless steel having a composition meeting Formula (1) is subjected to a casting process, a hot rolling process, and a cold rolling process, and then a cold-rolling annealing heat treatment, and yield point elongation is controlled to be no more than 1.1%, and a temperature of the cold-rolling annealing heat treatment after the cold rolling process is controlled at a temperature of 900 to 1100° C., and wherein, after cold-rolling annealing heat treatment, the stainless steel includes (Ti,Nb)(C,N) precipitates, and an area fraction (%) of the entire precipitates per unit area in the stainless steel is no more than 3.5%, and an area fraction (%) of (Ti,Nb)(C,N) precipitates/entire precipitates is 62% or more $$9.1C - 1.76V + 5.37(C+N)/Ti - 1.22Nb \leq 0.7 \qquad \text{Formula (1)}.$$

7. The method of claim 6, wherein the stainless steel further includes one or two elements selected from the group consisting of 0 to 4% of Mo and 0 to 1% of W in weight %.

8. The method of claim 6, further comprising molding the stainless steel into a thin plate for the fuel cell divider sheet.

9. The method of claim 6, wherein the stainless steel includes more than 0 to no more than 0.3% of Ni in weight %, and no more than 0.032% of C+N.

* * * * *

UNITED STATES PATENT AND TRADEMARK OFFICE
CERTIFICATE OF CORRECTION

| | |
|---|---|
| PATENT NO. | : 9,777,344 B2 |
| APPLICATION NO. | : 14/368689 |
| DATED | : October 3, 2017 |
| INVENTOR(S) | : Jong Hee Kim et al. |

It is certified that error appears in the above-identified patent and that said Letters Patent is hereby corrected as shown below:

In the Claims

Column 14, Line 29, Claim 6, delete "manfuacturing" and insert -- manufacturing --

Signed and Sealed this
Second Day of January, 2018

Joseph Matal
*Performing the Functions and Duties of the*
*Under Secretary of Commerce for Intellectual Property and*
*Director of the United States Patent and Trademark Office*